(12) United States Patent
Burling

(10) Patent No.: US 11,046,130 B2
(45) Date of Patent: Jun. 29, 2021

(54) SECURING DEVICE FOR ATTACHING A CABLE TO A TOW BALL

(71) Applicant: JB INNOVATIONS LIMITED, New Plymouth (NZ)

(72) Inventor: John Menzies Burling, Eltham (NZ)

(73) Assignee: JB Innovations Limited, New Plymouth (NZ)

( * ) Notice: Subject to any disclaimer, the term of this patent is extended or adjusted under 35 U.S.C. 154(b) by 60 days.

(21) Appl. No.: 16/494,596

(22) PCT Filed: Mar. 16, 2018

(86) PCT No.: PCT/NZ2018/050032
§ 371 (c)(1),
(2) Date: Sep. 16, 2019

(87) PCT Pub. No.: WO2018/169417
PCT Pub. Date: Sep. 20, 2018

(65) Prior Publication Data
US 2021/0114421 A1   Apr. 22, 2021

(30) Foreign Application Priority Data
Mar. 16, 2017   (NZ) ........................................ 730172

(51) Int. Cl.
*B60D 1/06*  (2006.01)
*B60D 1/28*  (2006.01)
*B60D 1/02*  (2006.01)

(52) U.S. Cl.
CPC .................. *B60D 1/06* (2013.01); *B60D 1/28* (2013.01); *B60D 1/02* (2013.01)

(58) Field of Classification Search
CPC ... B60D 1/06; B60D 1/07; B60D 1/28; B60D 1/187; B60D 1/02; B60D 1/04; B60D 1/18
USPC .............................. 280/511, 416.1, 480, 457
See application file for complete search history.

(56) References Cited

U.S. PATENT DOCUMENTS 2,984,502 A   5/1961  Tyrrell
3,123,383 A   3/1964  Humpal
6,217,054 B1  4/2001  Klimek et al.
(Continued)

OTHER PUBLICATIONS

International Search Report dated Jun. 21, 2018, issued in PCT Application No. PCT/NZ2018/050032, filed Mar. 16, 2018.
(Continued)

*Primary Examiner* — Minnah L Seoh
*Assistant Examiner* — Hosam Shabara
(74) *Attorney, Agent, or Firm* — Workman Nydegger

(57) ABSTRACT

A securing device for securing a cable to a tow ball, the tow ball having a head and a shank. The securing device has an element with a slot. The slot has a first portion wider than the head of the tow ball, and a second portion narrower than the head of the tow ball and wider than the shank of the tow ball. In one embodiment, the device has a resilient blocking member to block movement of the tow ball from the second portion to the first portion by extending across the slot between the first portion and the second portion and biasing the tow ball towards the second portion. In another embodiment, the device has a coupling member for releasably coupling the cable to the element and the first portion of the slot is adapted to receive the coupling member.

28 Claims, 8 Drawing Sheets

(56) References Cited

U.S. PATENT DOCUMENTS

| | | | |
|---|---|---|---|
| 7,926,830 B2* | 4/2011 | Hill | B60D 1/06 |
| | | | 280/416.1 |
| 9,744,820 B1* | 8/2017 | Robins | B60D 1/18 |
| 2009/0039617 A1 | 2/2009 | Klyeman | |
| 2010/0201100 A1 | 8/2010 | Hill | |
| 2011/0265442 A1 | 11/2011 | Segura | |
| 2012/0023710 A1 | 2/2012 | Wickstrom et al. | |

OTHER PUBLICATIONS

Written Opinion dated Jun. 21, 2018, issued in PCT Application No. PCT/NZ2018/050032, filed Mar. 16, 2018.

\* cited by examiner

SECURING DEVICE FOR ATTACHING A CABLE TO A TOW BALL

FIELD OF THE INVENTION

This invention relates to a securing device for securing a cable to a tow ball.

BACKGROUND

There are many situations where it is useful to be able to tow a heavy object behind a vehicle using a cable. A common example of such a situation is a vehicle towing another vehicle.

The tow ball of the towing vehicle is a convenient place to attach the cable. However, attaching the cable directly to the tow ball can be extremely dangerous because it is possible for the cable to slip off the tow ball. The sudden release of a cable under tension could cause the cable to whip around, potentially leading to injury or even death of nearby people, and/or damage to the towed object.

The object itself could also cause damage, or be damaged, if the cable slips off the tow ball. For example, if the object is being towed on a slope, the object could roll down the slope and collide with another object or a person.

Devices for securing objects to tow balls are known in the art. For example:

U.S. Pat. No. 3,123,383 to Humpal discloses a keyhole shaped safety device for a trailer hitch. The safety device is permanently attached to a trailer hitch via chains and is not readily adaptable for towing cables.

U.S. Pat. No. 7,926,830 to Hill discloses a hitch adaptor comprising a plate with a teardrop shaped opening for receiving a tow ball and a pivoting lock plate for securing the tow ball in the opening that is locked in place with a pin.

U.S. Pat. No. 6,217,054 to Klimek discloses a hitch comprising a plate with a keyhole shaped opening for receiving a tow ball and a slidingly mounted lock plate for securing the tow ball in the opening that is locked in place with a pin.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a device for safely securing a cable to a tow ball, and/or to at least provide the public with a useful alternative.

SUMMARY OF THE INVENTION

In accordance with one aspect of the invention, there is provided a securing device for securing a cable to a tow ball, the tow ball having a head and a shank, the securing device comprising:

an element with a slot, the slot having a first portion that is wider than the head of the tow ball, and a second portion that is narrower than the head of the tow ball and wider than the shank of the tow ball;

a resilient blocking member adapted to block movement of the tow ball from the second portion to the first portion by extending across the slot between the first portion and the second portion and biasing the tow ball towards the second portion.

In an embodiment, the blocking member is or comprises a flexible component.

In an embodiment, the blocking member is or comprises a spring.

In an embodiment, the element is or comprises a flat plate.

In an embodiment, the first portion of the slot has a substantially circular periphery.

In an embodiment, the second portion of the slot has a periphery with a section that is arcuate.

In an embodiment, the slot has straight edges extending between the first portion and the second portion.

In an embodiment, the edges are substantially parallel.

In an embodiment, the slot is sized to accommodate a 47.6 mm (1⅞ in) tow ball, a 50 mm (1³¹⁄₃₂ in) tow ball, or a 76.2 mm (3 in) tow ball.

In an embodiment, the slot is adapted to receive a coupling member for releasably coupling the cable to the element.

In an embodiment, the coupling member is or comprises a shackle.

In an embodiment, the coupling member comprises a U-shaped body and a pin, the pin adapted for threaded engagement with the U-shaped body.

In an embodiment, the element further comprises at least one aperture adapted to receive a coupling member for releasably coupling the cable to the element.

In an embodiment, the element comprises two apertures, each aperture adapted to receive a coupling member for releasably coupling the cable to the element.

In accordance with another aspect of the invention, there is provided a securing device for securing a cable to a tow ball, the tow ball having a head and a shank, the securing device comprising:

an element with a slot, the slot having a first portion that is wider than the head of the tow ball, and a second portion that is narrower than the head of the tow ball and wider than the shank of the tow ball;

a coupling member for releasably coupling the cable to the element;

the first portion of the slot being adapted to receive the coupling member;

wherein, when the securing device is assembled with the tow ball and the coupling member is received by the first portion of the slot, movement of the tow ball from the second portion to the first portion is substantially inhibited.

In an embodiment, when the coupling member is received by the first portion of the slot, movement of the tow ball from the second portion to the first portion is prevented.

In an embodiment, the element is or comprises a flat plate.

In an embodiment, the first portion of the slot has a substantially circular periphery.

In an embodiment, the second portion of the slot has a periphery with a section that is arcuate.

In an embodiment, the slot has straight edges extending between the first portion and the second portion.

In an embodiment, the edges are substantially parallel.

In an embodiment, the slot is sized to accommodate a 47.6 mm (1⅞ in) tow ball, a 50 mm (1³¹⁄₃₂ in) tow ball, or a 76.2 mm (3 in) tow ball.

In an embodiment, the coupling member is or comprises a shackle.

In an embodiment, the coupling member comprises a U-shaped body and a pin, the pin adapted for threaded engagement with the U-shaped body.

In an embodiment, the coupling member is sized or shaped such that the securing device is removable from the tow ball with the coupling member coupled to the securing device.

In an embodiment, the coupling member is sized or shaped such that the securing device cannot be removed from the tow ball with the coupling member coupled to the securing device.

In an embodiment, the element further comprises at least one aperture adapted to receive an additional coupling member for releasably coupling the cable to the element.

In an embodiment, the element comprises two apertures, each aperture adapted to receive an additional coupling member for releasably coupling the cable to the element.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

Figure 1:
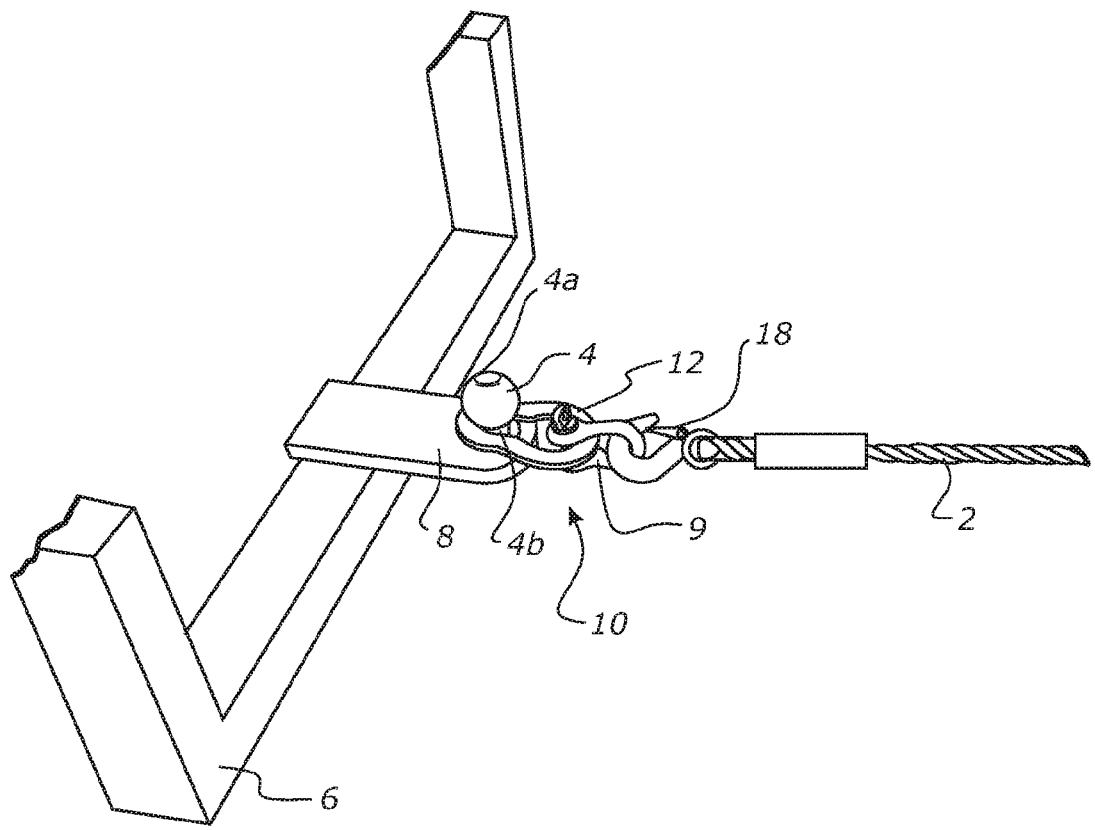
FIG. 1 shows a first embodiment of the securing device securing a cable to a tow ball.

FIG. 1 shows a first embodiment of the securing device 10 securing a cable 2 to a tow ball 4 of a vehicle 6. The tow ball 4 is a conventional tow ball and comprises a head 4a and a shank 4b. The vehicle 6 has a tongue 8 that extends rearwardly from the back of the vehicle 6. The tow ball 4 extends vertically from the tongue 8.

Figure 2:
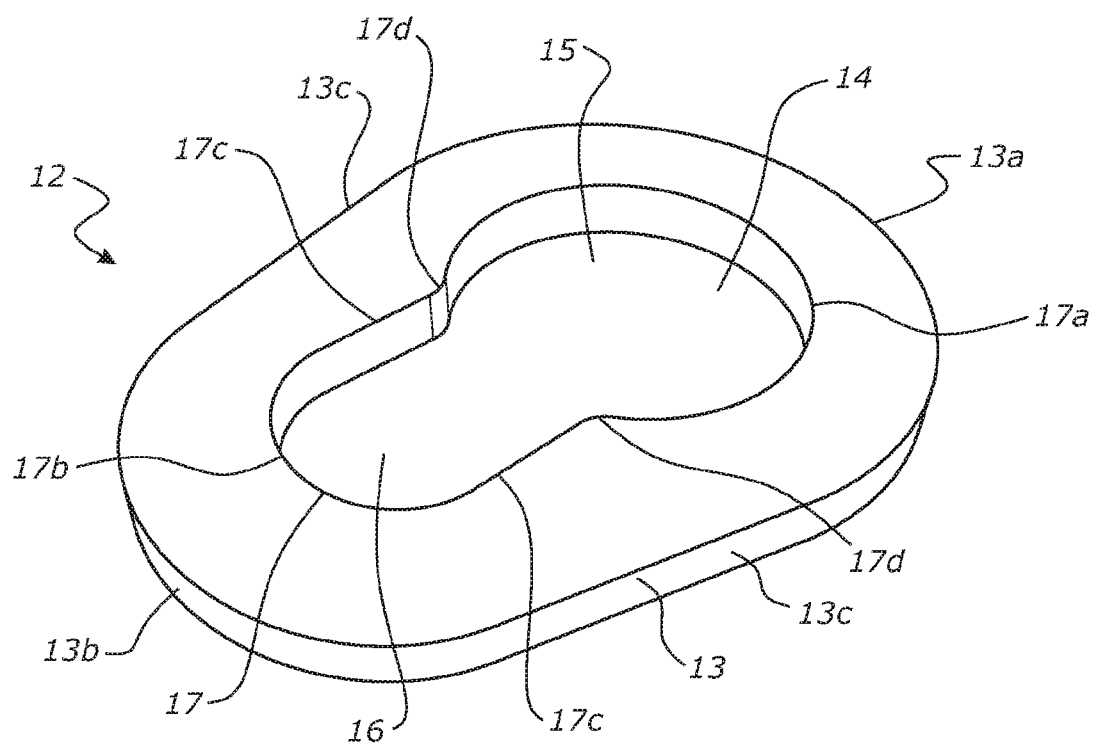
FIG. 2 shows the first embodiment of the securing device.
Figure 3:
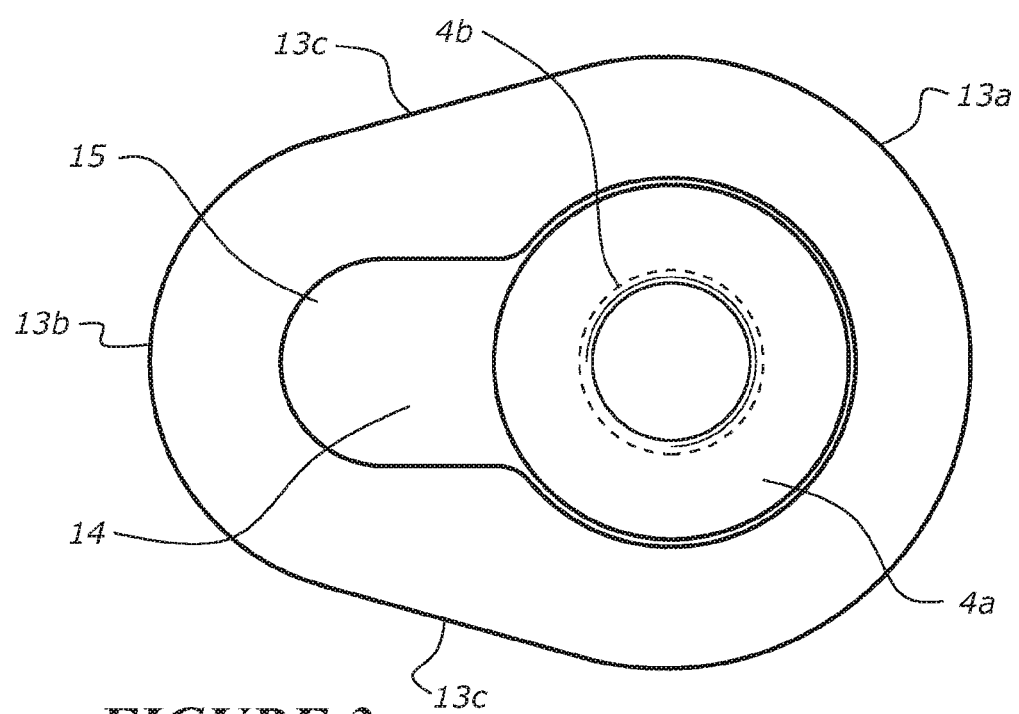
FIG. 3 shows a top view of the first embodiment of the securing device positioned over the tow ball.
Figure 4:
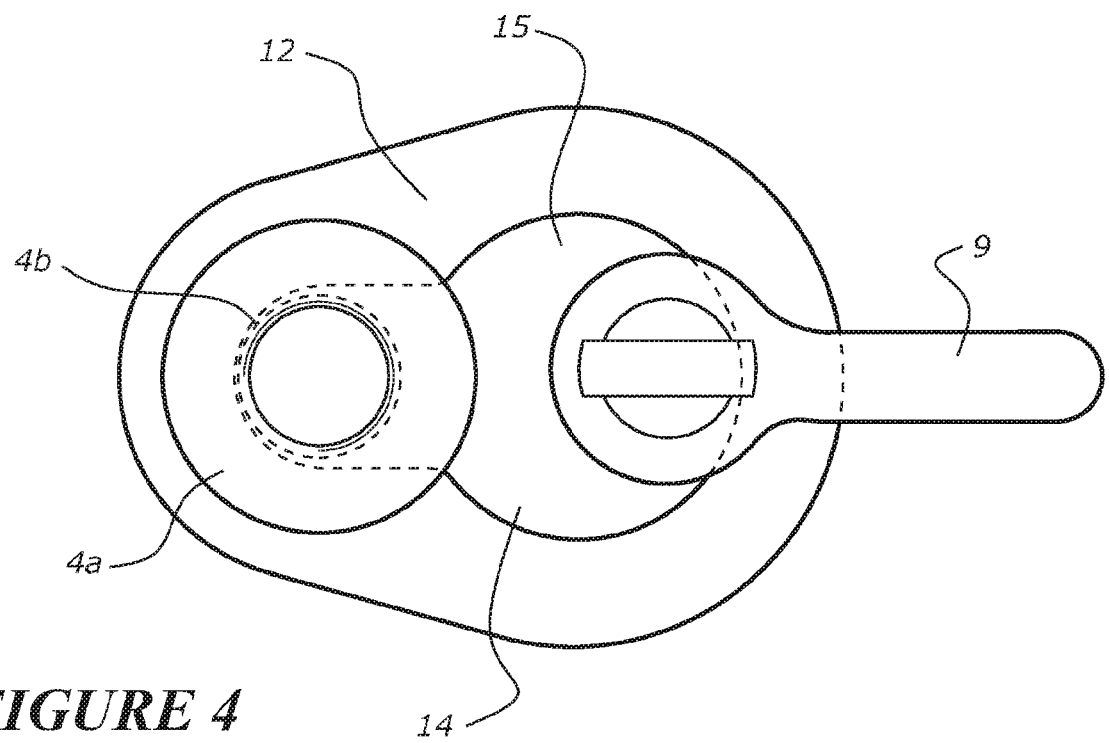
FIG. 4 shows a top view of the first embodiment of the securing device assembled on the tow ball with a coupling member attached through the slot of the securing device.

Referring to FIGS. 1 to 8, the details of the first embodiment of the securing device 10 will now be described. The securing device 10 has an element 12 with a slot 14 formed in the element 12. The cable 2 is releasably coupled to the element 12 by a coupling member 9. As shown in FIG. 4, the coupling member 9 extends through the slot 14.

Referring to FIGS. 2 to 4, the element 12 will now be described in detail. The preferred embodiment element 12 is a plate-like component having a flat upper surface and a flat lower surface. In the embodiment shown, the periphery 13 of the element 12 is determined by the shape of the slot 14. That is, the periphery of the element 12 has a wider portion 13a and a narrower portion 13b. In the embodiment shown, the wider portion 13a and the narrower portion 13b are connected by straight edges 13c.

The slot 14 of the element 12 has a first portion 15 (wider portion) and a second portion 16 (narrower portion). The wider portion 15 is wider than the head 4a of the tow ball 4. The narrower portion 16 is narrower than the head 4a of the tow ball 4. The narrower portion 16 is also wider than the shank 4b of the tow ball 4.

The dimensions of the slot 14 will be determined by the intended use of the securing device 10. In the embodiment shown, the slot 14 is sized to accommodate both a 47.6 mm (1⅞ in) tow ball, which is a standard size for many Japanese and American vehicles, and a 50 mm (1³¹⁄₃₂ in) tow ball, which is a standard tow ball size for many European vehicles. In alternative embodiments, the slot 14 may be sized to accommodate other tow ball sizes, for example, 50.8 mm (2 in), 58.7 mm (2⁵⁄₁₆ in) or 76.2 mm (3 in). It will be appreciated that the dimensions of the wider and narrower portions of the slot 14 will be chosen or designed depending on the intended use for the securing device 10.

The element 12 is a rigid component. In particular, the element 12 is fabricated from a flat plate of a suitable metal, such as mild steel or stainless steel. If the element 12 is formed from mild steel, it may be painted or galvanised for aesthetic or corrosion resistance purposes. The element 12 may be fabricated from any other material of suitable strength, for example stainless steel, titanium, carbon fibre composite or a reinforced plastic. It will be appreciated that the material of the element 12 will be chosen depending on the intended use for the securing device 10.

In alternative embodiments, the upper and lower surfaces of the element 12 may not be flat. For example, the cross section of the element 12 could include curved portions, and/or the narrower portion 16 of the slot 14 could be bevelled to better accommodate the radius that is typically present at the base of a tow ball shaft.

In the embodiment shown, the element 12 is about 8 mm thick. In other embodiments, the element 12 may be thicker or thinner, for example 6, 10, 12, 15, 16 or 20 mm thick. It will be appreciated that the thickness of the element 12 will be chosen or designed depending on the intended use for the securing device 10 and the material or combination of materials from which the element 12 is made.

In the embodiment shown, the slot 14 has a keyhole shaped periphery 17. In the embodiment shown, the wider portion 15 of the slot 14 has a substantially circular periphery 17a. The substantially circular periphery 17a is defined by a circular arc that extends through an angular distance of greater than 180°. The narrower portion 16 of the slot 14 has a periphery with a section 17b that is arcuate. The slot 14 has straight edges 17c extending between the wider portion and the narrower portion. The edges 17c are substantially parallel. The edges 17c extend tangentially from the arcuate section 17b of the second portion 16.

The points 17d where the edges 17c meet the circular periphery 17b of the wider portion may be rounded to reduce the risk of injury to a person using the device 10. In other embodiments, the slot 14 could have any other shape that has a wider and a narrower portion. One possible example is a teardrop shape, which is similar to the keyhole shape described above except that the straight edges 17c are not parallel, but are divergent. In this alternative embodiment, the edges 17c extend tangentially to both the circular periphery 17a of the first portion and the arcuate section 17b of the second portion. Another possible example is the wider portion 15 could have a square/rectangular shape and the narrower portion 16 could have a square/rectangular shape.

In the embodiment shown, the outer profile of the element 12 has a relatively large semi-circular portion 13a and a relatively small semi-circular portion 13b with straight edges 13c connecting the two semi-circular portions. In alternative embodiments, the periphery of the element 12 could have any shape that is able to carry the required loads when the device is in use. For example, the periphery of the element 12 could be generally rectangular or oval. Alternatively, the edges 13c could be curved or otherwise shaped such that they generally follow the profile of the slot 14 and/or apertures that are present in some embodiments.

In the embodiment shown in FIG. 1, the cable 2 is coupled to the coupling member 9 via a clip 18. In an alternative embodiment, the cable 2 may be attached directly to the coupling member 9. In another alternative embodiment, the clip 18 may be attached directly to the securing device 10. In another alternative embodiment, the cable 2 may be attached directly to the securing device 10. More than one cable 2 may be attached to the securing device 10 using any suitable combination of clips and coupling members.

The cable 2 may comprise a rope, a steel cable, or any other member suitable for connecting the securing device to an object to be towed.

The first portion 15 of the slot 14 is adapted to receive the coupling member 9. In the embodiment shown in the figures, the coupling member 9 comprises a shackle with a U-shaped body 20 and a pin 22. One end of the pin 22 has an external thread that engages with an internal thread on one end of U-shaped body 20. This type of shackle is commonly described as an anchor or bow shackle. In alternative embodiments, other types of shackles or coupling devices may be used, such as D-shackles, chain shackles or snap shackles.

In use, the securing device 10 is lowered over the tow ball 4 with the wider portion 15 of the slot 14 positioned over the tow ball 4 as shown in FIG. 3. The device is lowered until the shank 4b of the tow ball 4 is positioned in the slot 14. The securing device 10 is then moved linearly and/or rotationally so that the shank 4b of the tow ball 4 is located in the narrower portion 16 of the slot 14, as shown in FIG. 4. A coupling member 9 is connected through the wider portion 15 of the slot 14, as shown in FIG. 4.

When the securing device 10 is assembled with the tow ball 4 and the coupling member 9 is received by the first (wider) portion 15 of the slot 14, movement of the tow ball 4 from the second (narrower) portion 16 to the first (wider) portion 15 is substantially inhibited. In the embodiment shown, movement of the tow ball 4 from the narrower portion 16 to the wider portion 15 is prevented.

Figure 5:
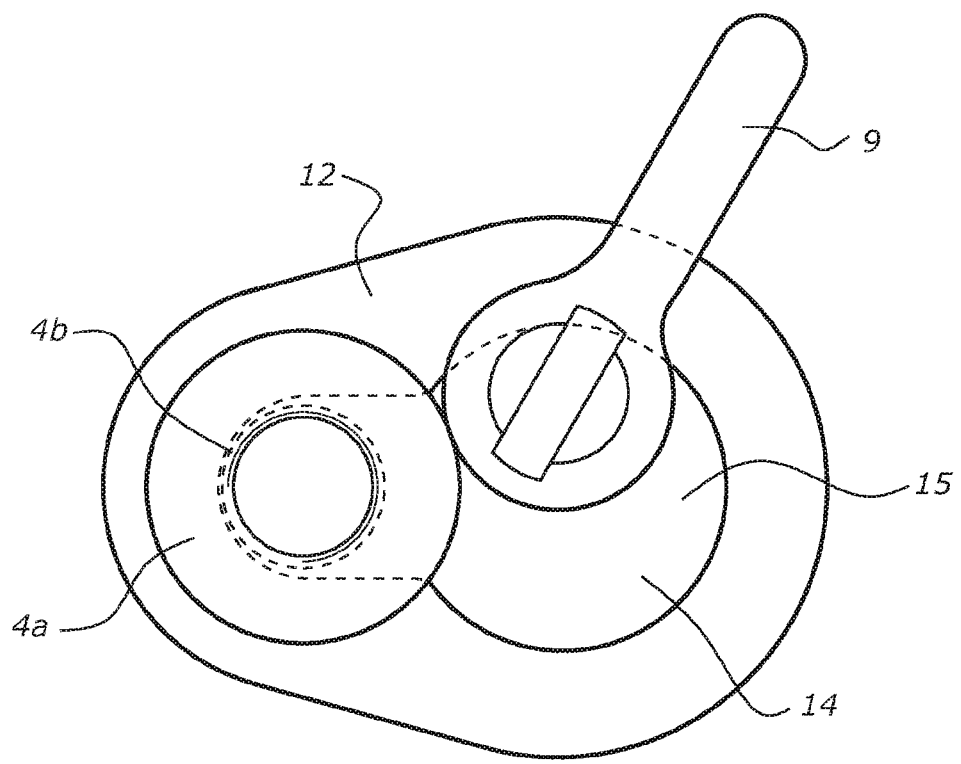
FIG. 5 shows a top view of the first embodiment of the securing device assembled on the tow ball with the coupling member orientated to illustrate the relative movement of the tow ball and the securing device is blocked.

When the coupling member 9 is orientated as shown in FIG. 5, the coupling member 9 blocks the relative movement of the tow ball 4 and the securing device 10 such that the securing device cannot be removed from the tow ball 4.

In an embodiment, the coupling member 9 is sized or shaped to block the relative movement of the tow ball 4 and the securing device 10 such that the securing device 10 cannot be removed from the tow ball 4 with the coupling member 9 coupled to the securing device 10. This could be achieved by sizing the U-shaped body 20 of the coupling member 9 such that the coupling member 9 and the tow ball 4 cannot pass each other in the wider portion 15 of the slot 14. Alternatively, the ends of the U-shaped portion could be shaped to prevent the coupling member 9 from rotating out of the position shown in FIGS. 4 and 5.

Figure 6:
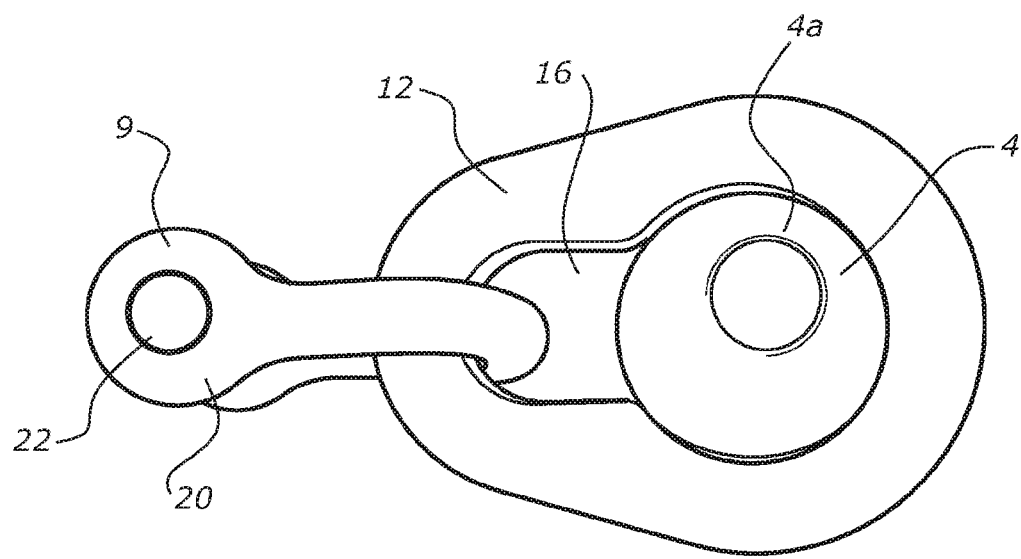
FIG. 6 shows a perspective view from above of a starting position for a method of assembling the securing device on the tow ball with the coupling member attached.
Figure 7:
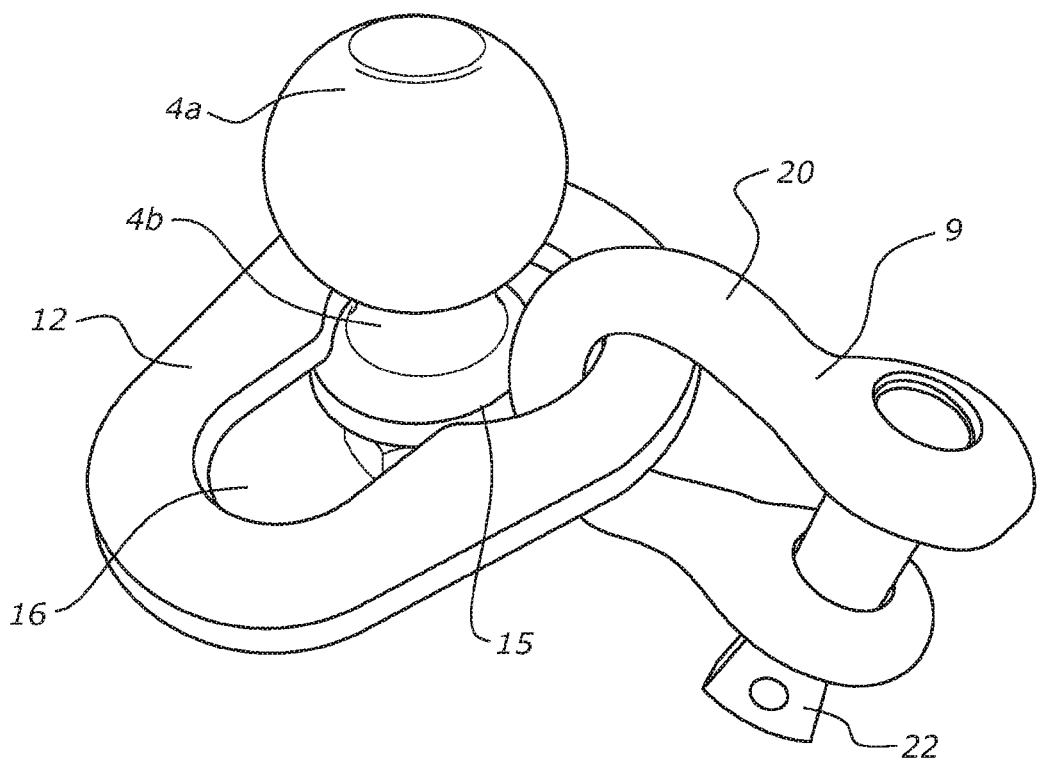
FIG. 7 shows a perspective view of the securing device in an intermediate position for the method of assembling the securing device on the tow ball with the coupling member attached.
Figure 8:
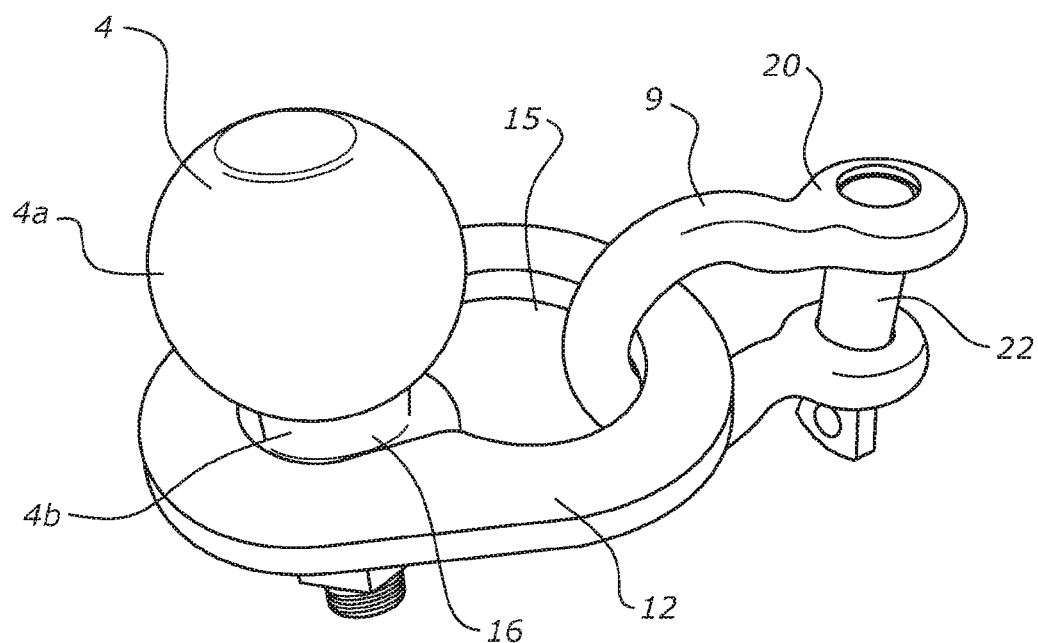
FIG. 8 shows a perspective view of the securing device in an assembled position for the method of assembling the securing device on the tow ball with the coupling member attached.
Figure 9:
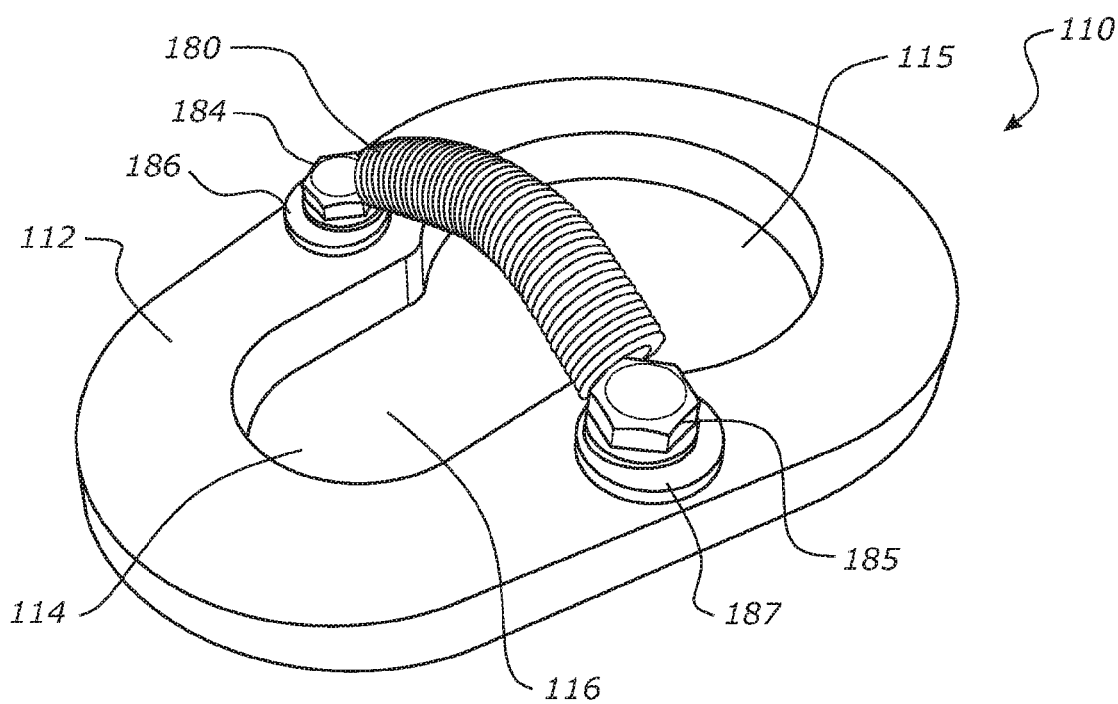
FIG. 9 shows a perspective view of a second embodiment of the securing device.

In the embodiment shown in FIGS. 6 to 8, the coupling member 9 is sized such that the securing device 10 can be assembled on the tow ball 4 while the coupling member 9 is coupled to the securing device 10. The securing device 10 is lowered over the tow ball 4 with the wider portion 15 of the slot 14 positioned over the tow ball 4 and the coupling member 9 positioned in the narrower portion 16 of the slot 14 as shown in FIG. 6. The coupling member 9 is oriented such that the curved part of the U-shaped body 20 is located in the narrower portion 16 of the slot 14. The curved part of the U-shaped body 20 of the coupling member 9 is then moved adjacent to the shank 4b of the tow ball 4 in the wider portion 15 of the slot 14 as shown in FIG. 7. The securing device 10 and coupling member 9 are then moved linearly and/or rotationally so that the shank 4b of the tow ball 4 is located the narrower portion 16 of the slot 14 as shown in FIG. 8. The coupling member 9 can then be rotated into the position shown in FIG. 4.

The securing device 10 is removable from the tow ball 4 with the coupling member 9 coupled to the securing device 10 by performing the above steps in the reverse order.

When the securing device 10 is in use, tension on the cable 2 prevents the securing device 10 and coupling member 9 from moving into a position where they are able to disconnect from the tow ball 4.

FIGS. 9 to 12 show a second embodiment of the securing device 110. Like numbers are used to indicate like parts with the addition of 100. The second embodiment of the securing device 110 has similar features and functions to those described above in relation to the first embodiment of the securing device 10, except as described below. In particular, the second embodiment has a resilient blocking member in the form of a spring 180.

The spring 180 is adapted to block movement of the tow ball 4 from the narrower portion 116 to the wider portion 115 of the slot. The spring 180 extends across the slot 114 between the wider portion 115 and the narrower portion 116. In an alternative embodiment, the spring 180, or other form of blocking member, may extend over another portion of the slot 114. The spring 180 biases or urges the tow ball 4 towards the narrower portion 116 of the slot 114.

In addition to being resilient, the spring 180 is a flexible blocking member. In particular, the spring is adapted to flex over the head 4a of the tow ball 4, when moved by a user.

In the embodiment shown in FIGS. 9 to 12, the spring 180 is a coil spring.

The ends of spring 180 are attached to the element 112 using fasteners 184, 185 and washers 186, 187. The washers 186, 187 provide a sufficiently large surface area to prevent the ends of the spring 180 from slipping over the heads of fasteners 184, 185. Washers 186, 187 may not be necessary if fasteners with suitably sized heads are used.

In alternative embodiments, the spring 180 may be secured using other means. For example, the spring 180, or other form of the blocking member, may pass through holes in the element 112 and the ends of the spring or other blocking element may be deformed such that they cannot pass back through the holes. If the spring is made from an elastomeric material, the ends of the elastomeric material may be passed through holes in the element 112 and knotted. Alternatively, if the spring is made from a metallic material, the ends of the spring may be welded directly to the element 112.

Figure 10:
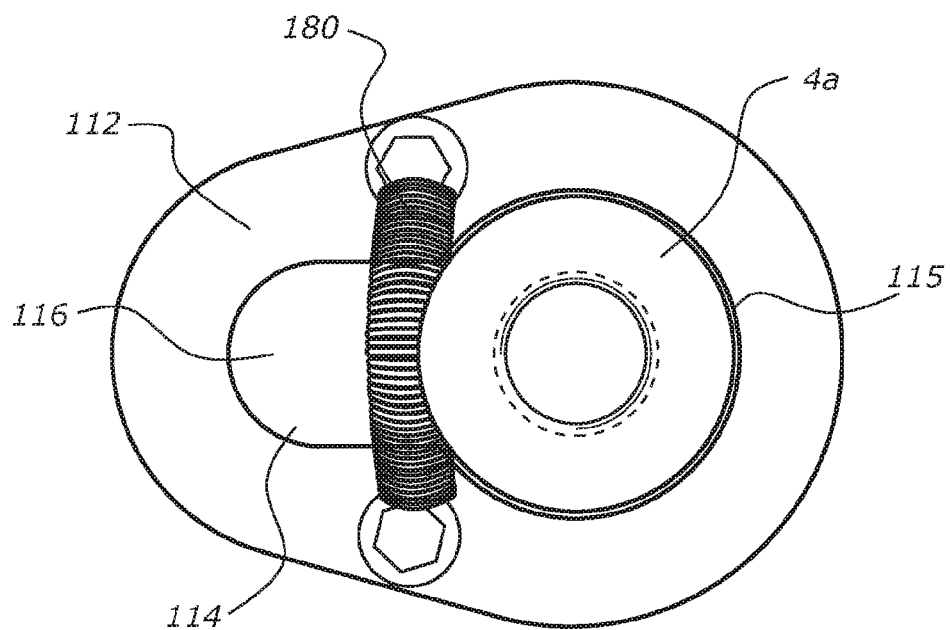
FIG. 10 shows a top view of the second embodiment of the securing device positioned over the tow ball.
Figure 11:
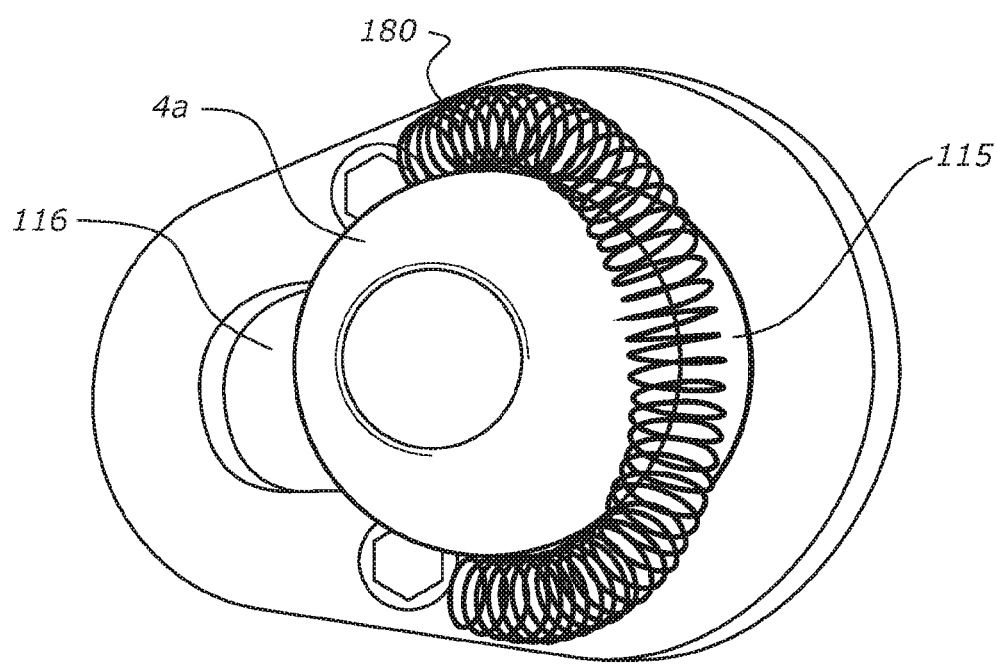
FIG. 11 shows a perspective view of the second embodiment of the securing device during assembly on the tow ball, with the blocking device being passed over the top of the tow ball.

In use, the securing device 110 is lowered over the tow ball 4 with the wider portion 115 of the slot 114 positioned over the tow ball 4 as shown in FIG. 10. The spring 180 is then passed over the head of the tow ball 4a as shown in FIG. 11. The spring 180 biases the tow ball towards the narrower portion 116 of the slot 114 as shown in FIG. 12.

Alternatively, the spring 180 is stretched so that it extends around the wider portion 115 of the slot 114 (not illustrated). The securing device 110 is then lowered over the tow ball 4 and the spring 180 is released to bias the tow ball 4 towards the narrower portion 116 of the slot 114.

Figure 12:
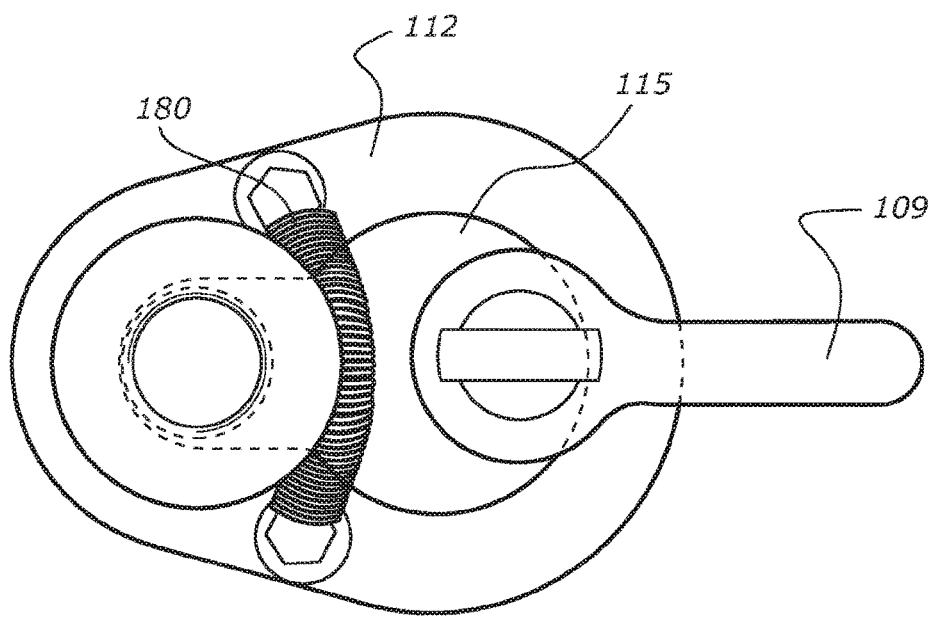
FIG. 12 shows a top view of the second embodiment of the securing device assembled on the tow ball with a coupling member attached through the slot of the securing device.

A coupling member 109 is connected through the wider portion 115 of the slot 114 as shown in FIG. 12. In an embodiment, the coupling member 109 is sized such that the securing device 110 can be assembled on the tow ball 4 while the coupling member 109 is coupled to the securing device 110 using a similar method to that described for securing device 10 above and illustrated in FIGS. 6 to 8.

Figure 13:
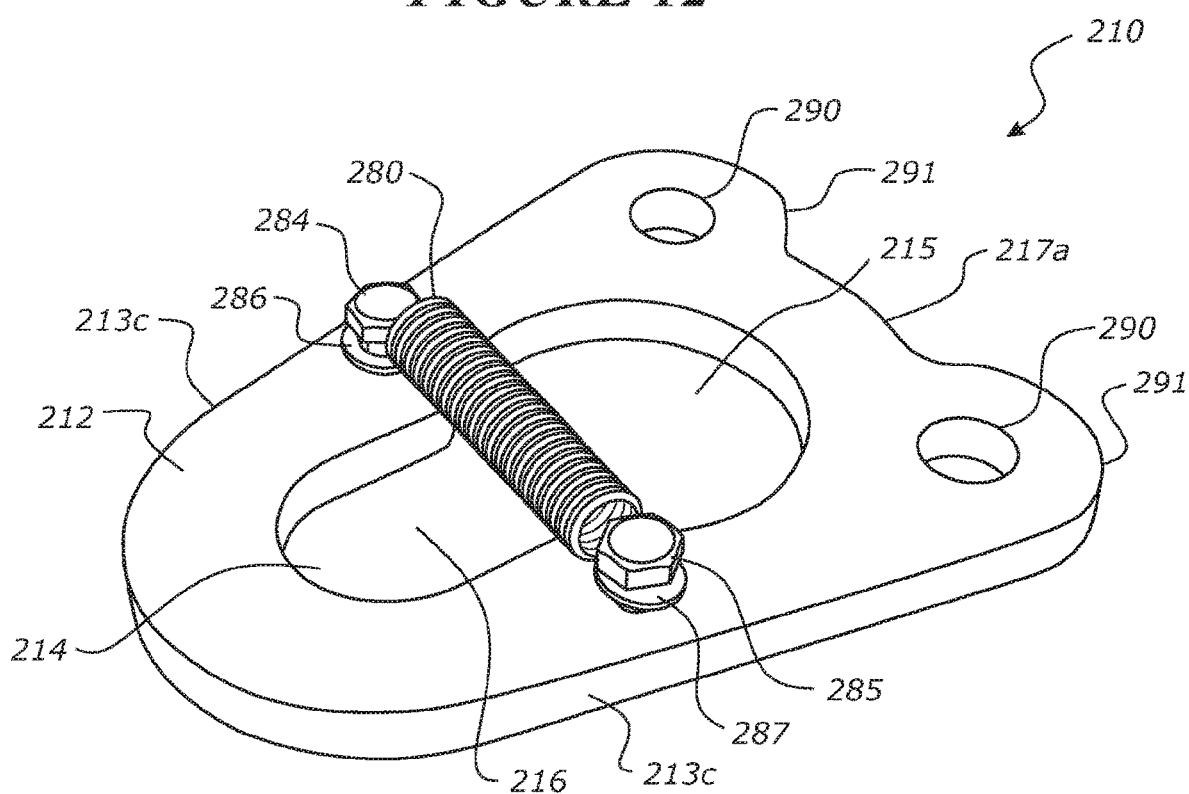
FIG. 13 shows a perspective view of a third embodiment of the securing device.
Figure 14:
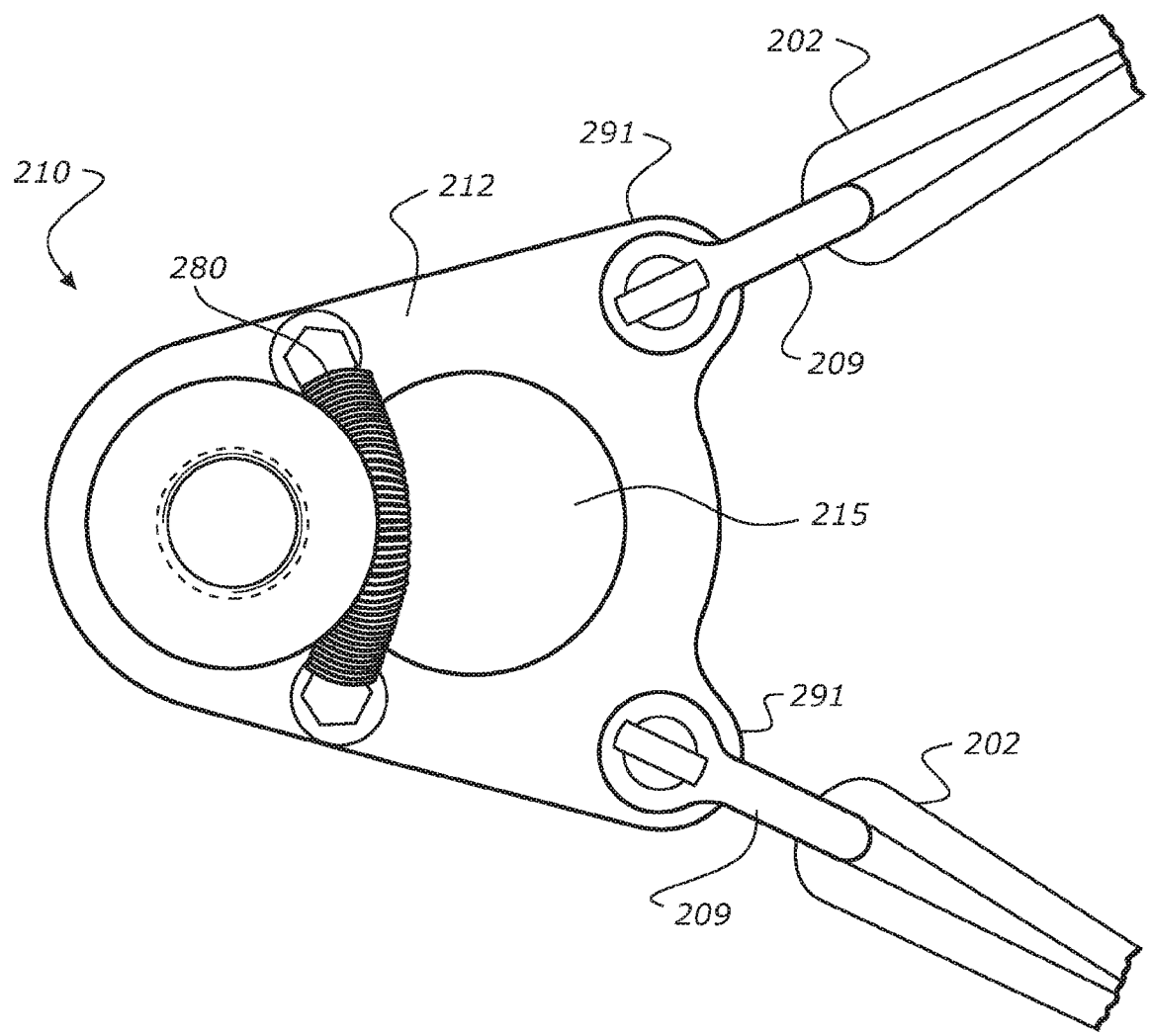
FIG. 14 shows a top view of the third embodiment of the securing device assembled on the tow ball with coupling members attached through the apertures of the securing device.

FIGS. 13 and 14 illustrate a third embodiment of the securing device 210. Like numbers are used to indicate like parts to the second embodiment with the addition of 100. The third embodiment of the securing device 210 has similar features and functions to those described above in relation to the second embodiment of the securing device 110, except as described below. In particular, the third embodiment has at least one aperture 290 in the element 212 for receiving a coupling member 209.

The embodiment of the securing device 210 shown in FIGS. 13 and 14 is particularly suited to applications where an object is towed with two spaced apart cables 202.

In the embodiment shown, the element 212 of the securing device 210 has two apertures 290. The apertures 290 are arranged so that when the securing device 210 is in use, tension in the cables 202 prevents the securing device 210 from moving into a position where it is able to disconnect from the tow ball 4.

In the embodiment shown, the apertures 290 are generally circular in shape. In alternative embodiments, the apertures 290 could be any other shape suitable for receiving a coupling member 209. For example, the apertures 290 could be generally oval in shape.

In alternative embodiments, the element 212 has a different number of apertures, for example one or three apertures.

In the embodiment shown, the shape of the outer profile of the element 212 is similar to that of the first and second embodiment securing devices 10, 110 described above, with the addition of lugs 291. The lugs 291 have a substantially circular periphery that is generally concentric with their corresponding aperture 290. The straight edges 213c of the element 212 extend tangent to the lugs 291. The circular periphery 217a extends between the lugs 291. A radius is provided where each lug 291 meets the circular periphery 217a.

In alternative embodiments, the periphery of the element 212 could have any shape that is able to carry the required loads when the securing device 210 is in use. For example, the periphery could be generally triangular.

In use, the securing device 210 is assembled with the tow ball 4 in a similar manner to that described above in relation to the second embodiment securing device 110. The securing device 210 can be assembled with the tow ball 4 regardless of whether coupling member(s) 291 are secured in the aperture(s) 290.

In a further alternative embodiment, the device may be similar to the first embodiment and have the apertures described and shown in relation to FIGS. 13 and 14. That is, the element will have apertures like apertures 290, but no resilient blocking member.

Preferred embodiments of the invention have been described by way of example only and modifications may be made thereto without departing from the scope of the invention.

For example, the blocking member 180 could be any other suitable resilient member. For example, the blocking member may be an elastomeric strap that extends over part of, or across the width of the slot. In an alternative embodiment, the elastomeric material may be formed as a loop. In further alternative embodiments, parts of the blocking member may be rigid and other parts would be resilient and flexible so that the blocking member biases the head of the tow ball towards the narrower portion of the slot.

Any one or more of the edges of the device may have radiused edges. For example, the wider portion of the slot may have radiused edges so that if a cable, strop, rope, or webbing is received by the slot, the edge is less likely to cause damage or wear to the cable, strop, rope, or webbing.

The invention claimed is:

1. A securing device for securing a cable to a tow ball, the tow ball having a head and a shank, the securing device comprising:
   an element with a slot, the slot having a first portion that is wider than the head of the tow ball, and a second portion that is narrower than the head of the tow ball and wider than the shank of the tow ball; and
   a resilient blocking member adapted to block movement of the tow ball from the second portion to the first portion by extending across the slot between the first portion and the second portion and biasing the tow ball towards the second portion.

2. The securing device according to claim 1, wherein the blocking member is or comprises a flexible component.

3. The securing device according to claim 1, wherein the blocking member is or comprises a spring.

4. The securing device according to claim 1, wherein the element is or comprises a flat plate.

5. The securing device according to claim 1, wherein the first portion of the slot has a substantially circular periphery.

6. The securing device according to claim 1, wherein the second portion of the slot has a periphery with a section that is arcuate.

7. The securing device according to claim 1, wherein the slot has straight edges extending between the first portion and the second portion.

8. The securing device according to claim 7, wherein the edges are substantially parallel.

9. The securing device according to claim 1, wherein the slot is sized to accommodate a 47.6 mm (1⅞ in) tow ball, a 50 mm (1 31/32 in) tow ball, or a 76.2 mm (3 in) tow ball.

10. The securing device according to claim 1, wherein the slot is adapted to receive a coupling member for releasably coupling the cable to the element.

11. The securing device according to claim 1, wherein the element further comprises at least one aperture adapted to receive a coupling member for releasably coupling the cable to the element.

12. The securing device according to claim 11, wherein the element comprises two apertures, each aperture adapted to receive a coupling member for releasably coupling the cable to the element.

13. The securing device according to claim 1, wherein the coupling member is or comprises a shackle.

14. The securing device according to claim 1, wherein the coupling member comprises a U-shaped body and a pin, the pin adapted for threaded engagement with the U-shaped body.

15. A securing device for securing a cable to a tow ball, the tow ball having a head and a shank, the securing device comprising:
   an element with a slot, the slot having a first portion that is wider than the head of the tow ball, and a second portion that is narrower than the head of the tow ball and wider than the shank of the tow ball;
   a coupling member for releasably coupling the cable to the element;
   the first portion of the slot being adapted to receive the coupling member;
   wherein, when the securing device is assembled with the tow ball and the coupling member is received by the first portion of the slot, movement of the tow ball from the second portion to the first portion is substantially inhibited by the coupling member.

16. The securing device according to claim 15, wherein, when the coupling member is received by the first portion of the slot, movement of the tow ball from the second portion to the first portion is prevented.

17. The securing device according to claim 15, wherein the element is or comprises a flat plate.

18. The securing device according to claim 15, wherein the first portion of the slot has a substantially circular periphery.

19. The securing device according to claim 15, wherein the second portion of the slot has a periphery with a section that is arcuate.

20. The securing device according to claim 15, wherein the slot has straight edges extending between the first portion and the second portion.

21. The securing device according to claim 20, wherein the edges are substantially parallel.

22. The securing device according to claim 15, wherein the slot is sized to accommodate a 47.6 mm (1⅞ in) tow ball, a 50 mm (1 31/32 in) tow ball, or a 76.2 mm (3 in) tow ball.

23. The securing device according to claim 15, wherein the element further comprises at least one aperture adapted to receive a coupling member for releasably coupling the cable to the element.

24. The securing device according to claim 23, wherein the element comprises two apertures, each aperture adapted to receive a coupling member for releasably coupling the cable to the element.

25. The securing device according to claim 15, wherein the coupling member is or comprises a shackle.

26. The securing device according to claim 15, wherein the coupling member comprises a U-shaped body and a pin, the pin adapted for threaded engagement with the U-shaped body.

27. The securing device according to claim 15, wherein the coupling member is sized or shaped such that the securing device is removable from the tow ball with the coupling member coupled to the securing device.

28. The securing device according to claim 15, wherein the coupling member is sized or shaped such that the securing device cannot be removed from the tow ball with the coupling member coupled to the securing device.

* * * * *